(12) United States Patent
Lim et al.

(10) Patent No.: US 11,772,625 B2
(45) Date of Patent: Oct. 3, 2023

(54) ELECTRO-MECHANICAL BRAKE AND VEHICLE HAVING THE SAME

(71) Applicant: HL MANDO CORPORATION, Gyeonggi-do (KR)

(72) Inventors: Woochul Lim, Gyeonggi-do (KR); Joon-Kyu Song, Gyeonggi-do (KR); Pyeong Kook Son, Gyeonggi-do (KR); Jin Seok Kim, Gyeonggi-do (KR); Dae June Jung, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/974,714

(22) Filed: Oct. 27, 2022

(65) Prior Publication Data
US 2023/0130314 A1   Apr. 27, 2023

(30) Foreign Application Priority Data

Oct. 27, 2021   (KR) .................. 10-2021-0144598

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *B60T 17/22* (2013.01); *F16D 55/226* (2013.01);
(Continued)

(58) Field of Classification Search
CPC ...... B60T 13/741; B60T 13/746; B60T 1/065; B60T 17/22; F16D 55/226; F16D 65/16;
(Continued)

(56) References Cited

U.S. PATENT DOCUMENTS 4,804,073 A * 2/1989 Taig .................. F16D 65/18
                                                    475/342
4,836,338 A * 6/1989 Taig .................. F16H 25/20
                                                    188/161
(Continued)

FOREIGN PATENT DOCUMENTS

CN          1378624         11/2002
CN          1387614         12/2002
(Continued)

OTHER PUBLICATIONS

Notice of Allowance dated May 16, 2022 for Korean Patent Application No. 10-2021-0144598 and its English translation provided by Applicant's foreign counsel.
(Continued)

*Primary Examiner* — Nicholas J Lane
(74) *Attorney, Agent, or Firm* — Ladas & Parry, LLP (57) ABSTRACT

Provided are an electromechanical brake and a vehicle including the same. An electromechanical brake according to an embodiment of the present disclosure includes a first brake pad and a second brake pad configured to respectively press a front surface and a rear surface of a disc and includes a housing having one side to which the first brake pad is coupled, a carrier to which the second brake pad is fixed, the carrier being coupled to the housing so that the second brake pad advance or retreat toward the disc, a hollow motor installed on the housing and configured to provide rotational driving power, the hollow motor having an internal space penetratively formed in a direction in which the rotation axis extends, a rotary screw extending and disposed in the internal space, the rotary screw being configured to rotate about the rotation axis of the motor, a power train coupled to a rear side of the motor and configured to transmit the rotational driving power of the motor to the rotary screw, (Continued)

and a nut coupled to the rotary screw and configured to advance or retreat toward the second brake pad.

14 Claims, 8 Drawing Sheets

(51) Int. Cl.
| | | |
|---|---|---|
| *F16D 55/226* | (2006.01) | |
| *F16D 65/16* | (2006.01) | |
| *B60T 17/22* | (2006.01) | |
| *F16D 66/00* | (2006.01) | |
| *F16D 121/24* | (2012.01) | |
| *F16D 125/40* | (2012.01) | |
| *F16D 125/50* | (2012.01) | |

(52) U.S. Cl.
CPC ........ *F16D 65/16* (2013.01); *F16D 2066/005* (2013.01); *F16D 2121/24* (2013.01); *F16D 2125/40* (2013.01); *F16D 2125/50* (2013.01)

(58) Field of Classification Search
CPC ............. F16D 2125/50; F16D 2125/40; F16D 2121/24
See application file for complete search history.

(56) References Cited

U.S. PATENT DOCUMENTS

| | | | | |
|---|---|---|---|---|
| 6,739,436 | B1* | 5/2004 | Kapaan | F16D 65/18 |
| | | | | 188/162 |
| 6,837,342 | B1* | 1/2005 | Olschewski | F16D 55/228 |
| | | | | 188/72.8 |
| 8,136,641 | B2* | 3/2012 | Wang | F16D 65/18 |
| | | | | 188/162 |
| 2002/0185340 | A1* | 12/2002 | Kojima | F16D 65/18 |
| | | | | 188/72.8 |
| 2010/0292043 | A1* | 11/2010 | Tao | F16H 57/028 |
| | | | | 475/344 |
| 2020/0307540 | A1* | 10/2020 | Jang | B60T 7/045 |

FOREIGN PATENT DOCUMENTS

| | | |
|---|---|---|
| CN | 1981142 | 6/2007 |
| CN | 103192722 | 7/2013 |
| DE | 10 2005 055 085 | 4/2007 |
| DE | 10 2013 010 068 | 1/2014 |
| JP | 2008-275053 | 11/2008 |
| KR | 10-2014-0140851 | 12/2014 |
| KR | 10-2020-0098219 | 8/2020 |
| KR | 10-2021-0002010 | 1/2021 |
| KR | 10-2021-0005532 | 1/2021 |
| KR | 10-2021-0042587 | 4/2021 |
| KR | 10-2021-0054762 | 5/2021 |
| KR | 10-2021-0077001 | 6/2021 |

OTHER PUBLICATIONS

Office Action dated Feb. 15, 2022 for Korean Patent Application No. 10-2021-0144598 and its English translation from Global Dossier.

Office Action dated Mar. 9, 2023 for German Patent Application No. 10 2022 211 394.2 and its English machine translation provided by Google Translate.

Office Action dated May 11, 2023 for Chinese Patent Application No. 202211310529.4 and its English machine translation provided by Google Translate.

* cited by examiner

CROSS-SECTIONAL VIEW TAKEN ALONG LINE A-A

ELECTRO-MECHANICAL BRAKE AND VEHICLE HAVING THE SAME

CROSS REFERENCE TO RELATED APPLICATION

The present application claims priority to Korean Patent Application No. 10-2021-0144598, filed Oct. 27, 2021, the entire contents of which is incorporated herein for all purposes by this reference.

BACKGROUND

Technical Field

The present disclosure generally relates to an electromechanical brake and a vehicle including the same, and more particularly, to an electromechanical brake and a vehicle including the same, which provide a pressing force by using rotational driving power of a motor.

Description of the Related Art

In general, a brake device refers to a device for stopping a vehicle to prevent the vehicle from moving when the vehicle is braked or parked. The brake device serves to hold a wheel of the vehicle to prevent the wheel from rotating.

Recently, an electromechanical brake (EMB) system for electronically controlling an operation of a brake has been developed. The electromechanical brake may not only be operated by a manual manipulation of a driver, but also be operated automatically in the case of a vehicle to which an autonomous driving system is applied. Therefore, it is possible to implement a very convenient and high-grade vehicle.

The electromechanical brake, which provides the braking force to the vehicle by pressing a disc of the electromechanical brake, controls a rotation of the disc by pressing the disc by using a screw or a nut by transmitting rotational driving power of the motor to a structure having the screw and the nut screw-coupled to each other.

In this case, because the rotational driving power of the motor cannot be transmitted directly to the screw or the nut, a sun gear, two ring gears, and planet gears are used to reduce a speed and transmit power to the screw or the nut. In the related art, two planet gears are provided and respectively engage with the two ring gears. This structure with the planet gears causes problems in that the number of components increases, the complicated design is required, and the power transmission efficiency deteriorates. Therefore, there is a need for a planet gear structure capable of improving the power transmission efficiency, reducing the number of components, and simplifying the design.

Meanwhile, in the related art, only a parking brake for parking the vehicle is provided with driving power by using a motor that may be electronically controlled. However, hydraulic pressure, which is generally used, is used to provide driving power to a service brake for controlling traveling. In case that the parking brake and the service brake are provided separately as described above, there are problems in that a size of a space occupying the inside of the vehicle increases, and an overall weight of the vehicle increases.

Therefore, there is an increasing need for an electromechanical brake capable of performing a parking brake function and a traveling brake function with a single device and being electronically controlled, such that a hydraulic line may be removed, and a space in the vehicle may be efficiently used.

Document of Related Art (Patent Document 0001) Korean Patent Application Laid-Open No. 10-2021-0042587 (Caliper Brake)

SUMMARY

The present disclosure is proposed to solve these problems and aims to provide an electromechanical brake capable of providing an electronically braking force.

The present disclosure also aims to provide an electromechanical brake capable of improving power transmission efficiency of a power train for transmitting driving power of a motor.

The present disclosure also aims to provide an electromechanical brake capable of electronically providing a service brake function and a parking brake function without a hydraulic line.

The present disclosure also aims to provide an electromechanical brake that is relatively less damaged and has a rotary screw with a small backlash in a braking environment in which dust and foreign substances are easily produced.

The present disclosure also aims to provide an electromechanical brake capable of maintaining a braking force of the brake in a parking situation.

Technical problems to be solved by the present disclosure are not limited to the above-mentioned technical problems, and other technical problems, which are not mentioned above, may be clearly understood from the following descriptions by those skilled in the art to which the present disclosure pertains.

To achieve the above-mentioned objects, one aspect of the present disclosure provides an electromechanical brake, which includes a first brake pad and a second brake pad configured to respectively press a front surface and a rear surface of a disc, the electromechanical brake including: a housing having one side to which the first brake pad is coupled; a carrier to which the second brake pad is fixed, the carrier being coupled to the housing so that the second brake pad advance or retreat toward the disc; a hollow motor installed on the housing and configured to provide rotational driving power, the hollow motor having an internal space penetratively formed in a direction in which the rotation axis extends; a rotary screw extending and disposed in the internal space, the rotary screw being configured to rotate about the rotation axis of the motor; a power train coupled to a rear side of the motor and configured to transmit the rotational driving power of the motor to the rotary screw; and a nut coupled to the rotary screw and configured to advance or retreat toward the second brake pad.

In this case, the power train may include: a sun gear coupled to the rear side of the motor and configured to be rotated about the rotation axis by the rotational driving power of the motor; a planetary gear structure disposed outside the sun gear and including one or more planet gears each having a front end that engages with the sun gear; a first ring gear having an inner portion that engages with the front ends of the one or more planet gears; and a second ring gear having an inner portion that engages with rear ends of the one or more planet gears, a rear end of the rotary screw may be coupled to the second ring gear, and the rotary screw may rotate about the rotation axis together with the second ring gear.

In this case, the number of gear teeth of the first ring gear may be different from the number of gear teeth of the second ring gear.

In this case, the nut may be disposed between the rotary screw and the motor, an outer peripheral surface of the nut may correspond to an inner peripheral surface of the motor, and an anti-rotation part may be provided between the nut and the motor and prevent the nut from rotating together with the rotary screw.

In this case, the anti-rotation part may include: a first cut-out surface formed on the outer peripheral surface of the nut in a longitudinal direction of the rotary screw; and a second cut-out surface formed on the inner peripheral surface of the motor and corresponding to the cut-out surface.

In this case, a plate may be provided at a rear side of the second ring gear, the plate may have a hole formed at a center thereof, and a rear end of the rotary screw may be fixedly inserted into the hole.

In this case, the electromechanical brake may further include: a cover disposed at a rear side of the housing and configured to cover the motor and the power train; and a thrust bearing disposed between the cover and the plate of the second ring gear to support a load according to an axial force of the rotary screw.

In this case, the electromechanical brake may further include: a cover disposed at a rear side of the housing and configured to cover the motor and the power train; and a force sensor disposed between the cover and the plate of the second ring gear to measure a load according to an axial force of the rotary screw.

In this case, the electromechanical brake may further include: a cover disposed at a rear side of the housing and configured to cover the motor and the power train, in which at least one fixing protrusion protrudes from an outer peripheral surface of the first ring gear, and at least one groove is formed in an inner peripheral surface of the cover so that the at least one fixing protrusion is inserted into the at least one groove so that the first ring gear is fixed to the cover.

In this case, the rotary screw may be coupled to the nut by ball-screw-nut coupling.

Another aspect of the present disclosure provides an electromechanical brake, which includes a first brake pad and a second brake pad configured to respectively press a front surface and a rear surface of a disc, the electromechanical brake including: a housing having one side to which the first brake pad is coupled; a carrier to which the second brake pad is fixed, the carrier being coupled to the housing so that the second brake pad advance or retreat toward the disc; a hollow motor installed on the housing and configured to provide rotational driving power, the hollow motor having an internal space penetratively formed in a direction in which the rotation axis extends; a rotary screw extending and disposed in the internal space, the rotary screw being configured to rotate about the rotation axis of the motor; a power train including a sun gear coupled to a rear side of the motor and configured to be rotated about the rotation axis by the rotational driving power of the motor, a planetary gear structure disposed outside the sun gear and including one or more planet gears each having a front end that engages with a rear end of the sun gear, a first ring gear having an inner portion that engages with the front ends of the one or more planet gears, the first ring gear having a front end surface disposed to be spaced apart from a rear end surface of the motor, and a second ring gear having an inner portion that engages with rear ends of the one or more planet gears, the power train being coupled to the rear side of the motor and configured to transmit the rotational driving power of the motor to the rotary screw; a nut coupled to the rotary screw and configured to advance or retreat toward the second brake pad; an auxiliary gear configured to engage with a front end of the sun gear and rotate about a rotation axis parallel to a rotation axis of the sun gear; and a rotation stopper configured to control the auxiliary gear so that the auxiliary gear rotates only in one direction, in which a rear end of the rotary screw is coupled to the second ring gear, and the rotary screw rotates about the rotation axis together with the second ring gear.

In this case, the rotation stopper may include a latch configured to be inserted into a first space formed at one side of the auxiliary gear, the auxiliary gear may be in a locked state in which the auxiliary gear rotates only in one direction when the latch inserted into the first space, and the auxiliary gear may be in an unlocked state in which the auxiliary gear rotates in two directions when the latch is withdrawn from the first space.

In this case, the latch may be pivotably fixed in the housing, the rotation stopper may further include: a plurality of protrusion portions continuously formed at one side of the auxiliary gear along a circumference of the auxiliary gear; and an actuator configured to control the pivot motion of the latch, and the first space may be provided as a plurality of first spaces disposed between the plurality of protrusion portions.

In this case, an inclined guide surface may be provided at one side of each of the plurality of protrusion portions in a circumferential direction of the auxiliary gear.

Still another aspect of the present disclosure provides a vehicle including: the above-mentioned electromechanical brake; a vehicle wheel having a one side to which a disc is coupled so that rotation axes of the vehicle wheel and the disc are coincident with each other; the first brake pad disposed at one side of the disc and coupled to the electromechanical brake; and the second brake pad disposed at the other side of the disc and coupled to the electromechanical brake, in which a rotational speed of the vehicle wheel is controlled by pressing the second brake pad in the state in which the unlocked state is maintained in a traveling state, and in which the locked state is maintained in the state in which the second brake pad is pressed in a parking state.

DETAILED DESCRIPTION OF THE INVENTION

Hereinafter, an embodiment of the present disclosure will be described in detail with reference to the accompanying drawings so that those skilled in the technical field to which the present disclosure pertains may easily carry out the embodiment. The present disclosure may be implemented in various different ways, and is not limited to the embodiments described herein. Unless otherwise defined, the terms used in the embodiments of the present disclosure may be interpreted as the meanings commonly known to those skilled in the art. Hereinafter, the term "couple" includes not only a case in which one constituent element is directly coupled to another constituent element, but also a case in which one constituent element is indirectly coupled to another constituent element through still another constituent element.

In the drawings, a part irrelevant to the description will be omitted to clearly describe the present disclosure, and the same or similar constituent elements will be designated by the same reference numerals throughout the specification.

Hereinafter, in FIG. 1, an X-axis is defined as a forward direction, a Y-axis is defined as a leftward direction, and a Z-axis is defined as an upward direction. However, the forward direction does not mean that a disc needs to be disposed at a front side of a vehicle. The forward direction refers to a relative direction different from another direction.

The present disclosure relates to an electromechanical brake, and more particularly, to an electromechanical brake that provides a braking force by pressing a disc by using a rotary screw that is rotated by rotational driving power of a motor.

Figure 1:
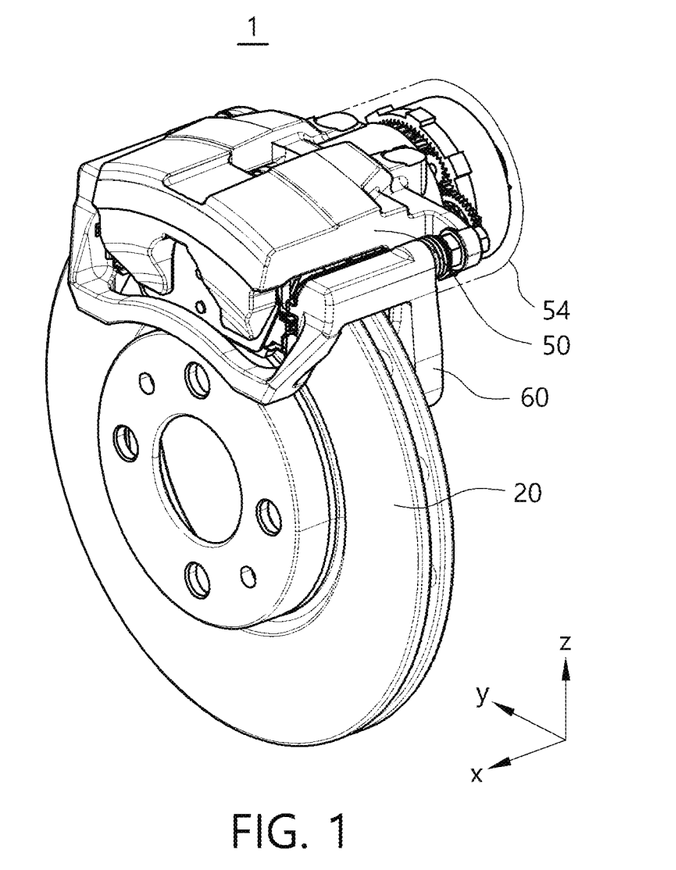
FIG. 1 is a perspective view of an electromechanical brake according to an embodiment of the present disclosure.
Figure 2:
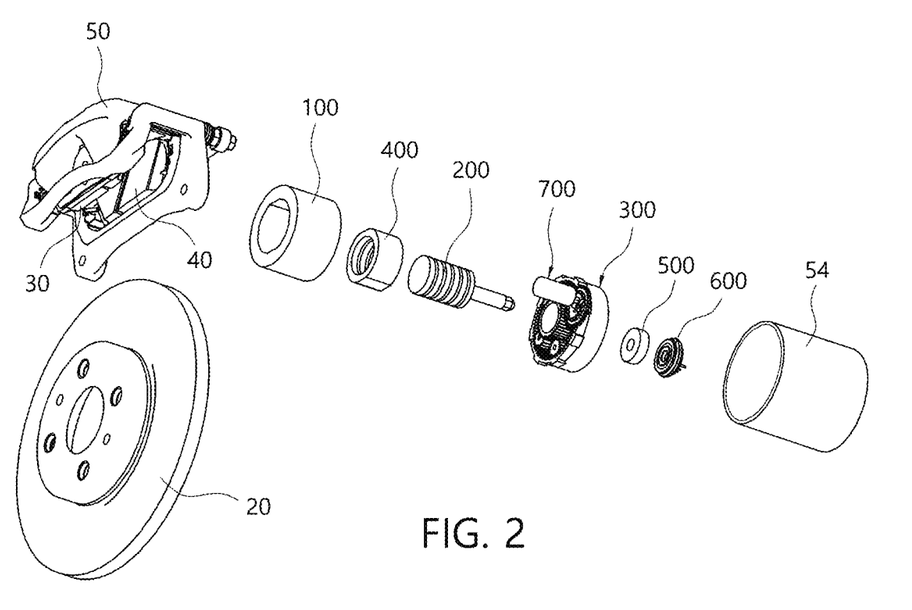
FIG. 2 is an exploded perspective view of the electromechanical brake according to the embodiment of the present disclosure.
Figure 3:
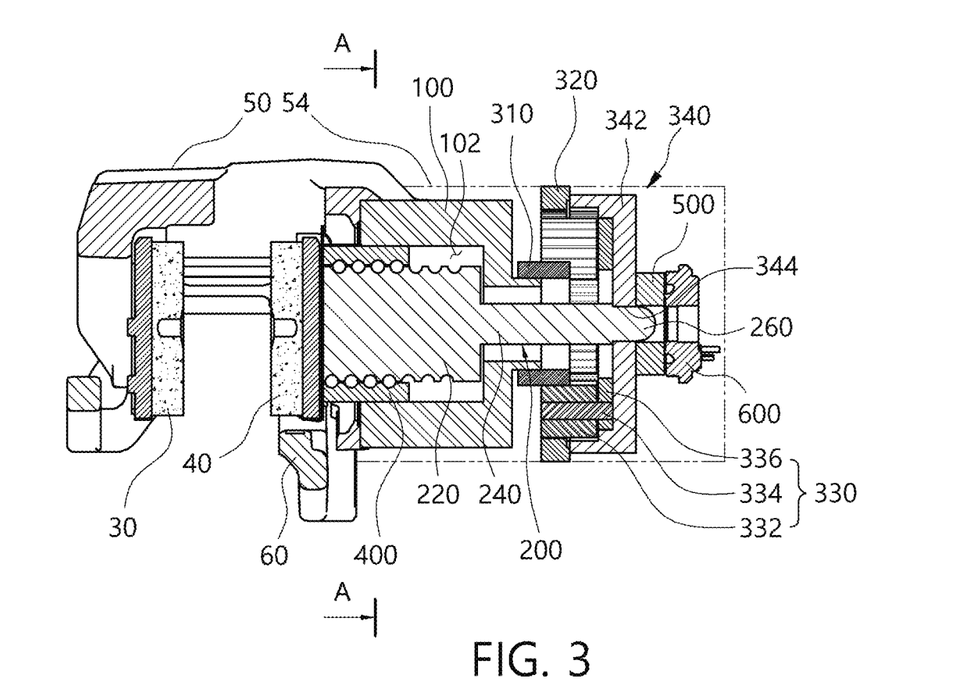
FIG. 3 is a longitudinal cross-sectional view of a rotary screw and a motor of the electromechanical brake according to the embodiment of the present disclosure.
Figure 4:
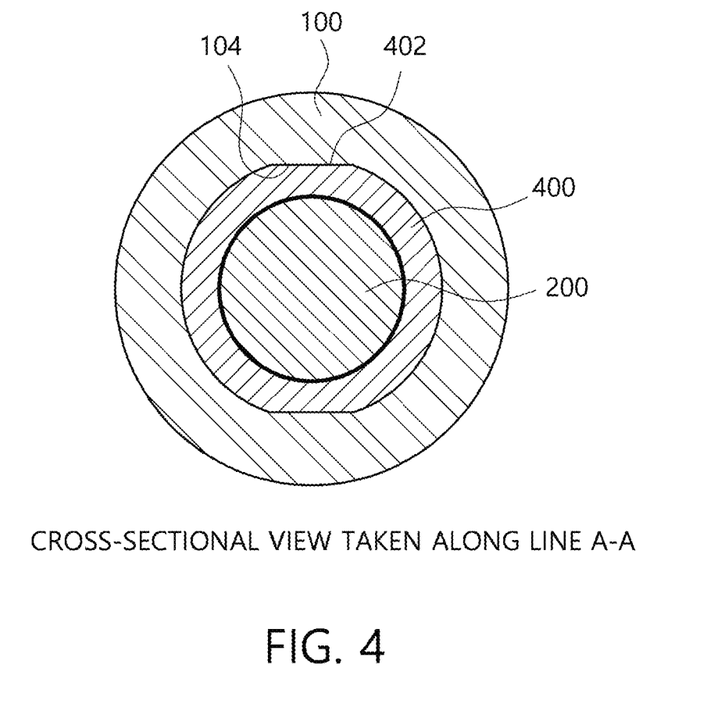
FIG. 4 is an enlarged cross-sectional view of a cross-section taken along line A-A in FIG. 3.

FIG. 1 is a perspective view of an electromechanical brake according to an embodiment of the present disclosure. FIG. 2 is an exploded perspective view of the electromechanical brake according to the embodiment of the present disclosure. FIG. 3 is a longitudinal cross-sectional view of a rotary screw and a motor of the electromechanical brake according to the embodiment of the present disclosure. FIG. 4 is an enlarged cross-sectional view of a cross-section taken along line A-A in FIG. 3.

An electromechanical brake 1 according to an embodiment of the present disclosure includes a first brake pad 30, a second brake pad 40, a housing 50, a motor 100, and a carrier 60.

Referring to FIGS. 1 to 3, the first brake pad 30 and the second brake pad 40 have surfaces respectively disposed adjacent to front and rear surfaces of a disc 20. As illustrated in FIG. 2, the first brake pad 30 is coupled to a front side of the housing 50. The carrier 60 may be installed in the housing 50 and advance or retreat toward the disc 20. In this case, the second brake pad 40 is coupled to the carrier 60.

In this case, as illustrated in FIG. 2, a motor 100 is fixed to a rear side of the housing 50 and provides power that allow the second brake pad 40 or both the first brake pad 30 and the second brake pad 40 to move to the disc 20 and press the disc 20. In this case, the type of motor, such as DC, BLDC (brushless DC), and AC motors, are not limited as long as the motor 100 may provide the rotational driving power.

In this case, as illustrated in FIG. 2, the motor 100 is a hollow motor 100 having a penetratively formed center. Therefore, as illustrated in FIG. 3, an internal space 102 is formed at a center of the hollow motor 100 and extends in a longitudinal direction. A rotary screw 200 and a nut 400, which will be described below, are inserted into the internal space 102. Because the hollow motor 100 is provided, the shape of the motor 100 may be used to guide a rectilinear movement route of the nut 400 without providing a separate component for guiding the movement route of the nut 400.

As illustrated in FIG. 3, the motor 100 provides the rotational driving power through a rear end thereof. A power train 300 to be described below is installed at a rear side of the motor 100. A cross-section area of the rear side of the internal space 102 of the motor 100 is smaller than a cross-section area of the center of the internal space 102 of the motor 100. Therefore, it is possible to prevent the rotary screw 200 inserted into the internal space 102 from separating rearward.

As illustrated in FIGS. 2 and 3, a cover 54 may be coupled to the rear side of the housing 50. The cover 54 may have a cup shape. The motor 100 and the power train 300 to be described below are disposed in the cover 54. The cover 54 protects the motor 100 and the power train 300 and prevents the motor 100 and the power train 300 from being exposed to outside foreign substances. The shape of the cover 54 is not limited, as long as the cover 54 may have a space therein and be configured such that the component is fixed to the cover 54.

As illustrated in FIG. 2, the electromechanical brake 1 according to the embodiment of the present disclosure includes the rotary screw 200, the power train 300, and the nut 400 to press the second brake pad 40 by using the rotational driving power of the motor 100.

As illustrated in FIG. 2, the rotary screw 200 has a cylindrical shape extending in the longitudinal direction and rotates by receiving the rotational driving power of the motor 100. As illustrated in FIG. 3, the rotary screw 200 is disposed in the internal space 102 of the motor 100 so that a rotation axis of the motor 100 and the rotation axis of the rotary screw 200 are coincident with each other.

As illustrated in FIG. 3, the rotary screw 200 includes a first body portion 220 formed at a front side thereof, a second body portion 240 formed at a rear side of the first body portion 220, and a third body portion 260 formed at a rear side of the second body portion 240. The first body portion 220, the second body portion 240, the third body portion 260 have radii that decrease rearward.

The first body portion 220 is disposed in the internal space 102 of the motor 100, and the second body portion 240 is disposed to penetrate the rear side of the motor 100. Therefore, as illustrated in FIG. 3, a rear rim portion of the first body portion 220 is caught by a stepped portion defined by a difference in cross-sectional area between the central portion and the rear portion of the internal space 102 of the motor 100, such that the first body portion 220 is prevented from separating rearward.

As illustrated in FIG. 3, the nut 400 is coupled to an outer peripheral surface of the first body portion 220 of the rotary screw 200. The third body portion 260 is disposed outside the motor 100 and coupled to the power train 300 to be described below. In this case, the second body portion 240 of the rotary screw 200 is disposed to penetrate the power train 300 so that the third body portion 260 receives the rotational driving power from the motor 100.

Meanwhile, the nut 400 coupled to the rotary screw 200 moves forward or rearward depending on the rotation direction of the rotary screw 200 as the rotary screw 200 is rotated by the rotational driving power of the motor 100.

In this case, the rotary screw 200 and the nut 400 may be coupled by ball-screw-nut coupling. In a brake system for providing a braking force by pressing the disc, dust may be easily produced because of friction between the brake pad and the disc. In addition, because the brake is generally provided on a wheel of the vehicle and disposed adjacent to a road surface, dust or foreign substances are easily raised when the wheel moves on the road surface. In this case, according to the electromechanical brake 1 according to the embodiment of the present disclosure, the rotary screw 200 and the nut 400 are coupled by ball-screw-nut coupling. Therefore, the rotary screw 200 and the nut 400 are less damaged even though dust is introduced between the rotary screw 200 and the nut 400, such that the durability may be improved.

In addition, because the rotary screw 200 and the nut 400 are coupled by ball-screw-nut coupling, the electromechanical brake 1 according to the embodiment of the present disclosure may more precisely control the brake because a backlash of the rotary screw 200 is small in comparison with general screw-coupling.

As illustrated in FIG. 3, the nut 400 may move forward or rearward relative to the motor 100 in a state in which an outer peripheral surface of the nut 400 is in contact with an inner peripheral surface of the motor 100. In this case, when the nut 400 moves forward, a front end surface of the nut 400 comes into contact with the second brake pad 40. When the rotary screw 200 further rotates, the nut 400 presses the second brake pad 40, and the second brake pad 40 presses the disc 20. Therefore, a frictional force is generated between the disc 20, the first brake pad 30, and the second brake pad 40.

In this case, as illustrated in FIG. 4, an anti-rotation part is provided between the nut 400 and the motor 100. When the nut 400 moves forward or rearward as the rotary screw 200 rotates, the anti-rotation part rotates together with the rotary screw 200 to prevent the rotation of the nut 400 to prevent the forward or rearward movement of the nut 400 from being obstructed.

The shape of the anti-rotation part is not limited as long as the anti-rotation part may prevent the nut 400 from rotating in the internal space 102 of the motor 100 and allow the nut 400 to move forward or rearward along the inner peripheral surface of the motor 100. For example, as illustrated in FIG. 4, a first cut-out surface 402 may be formed at one side of the outer peripheral surface of the nut 400 in the longitudinal direction of the rotary screw 200, and a second cut-out surface 104 may be formed at one side of the inner peripheral surface of the motor 100 in the longitudinal direction of the rotary screw 200. Therefore, as the first cut-out surface 402 and the second cut-out surface 104 are disposed to be in contact with each other, it is possible to prevent the nut 400 from rotating in the motor 100 in the rotation direction of the rotary screw 200.

Figure 5:
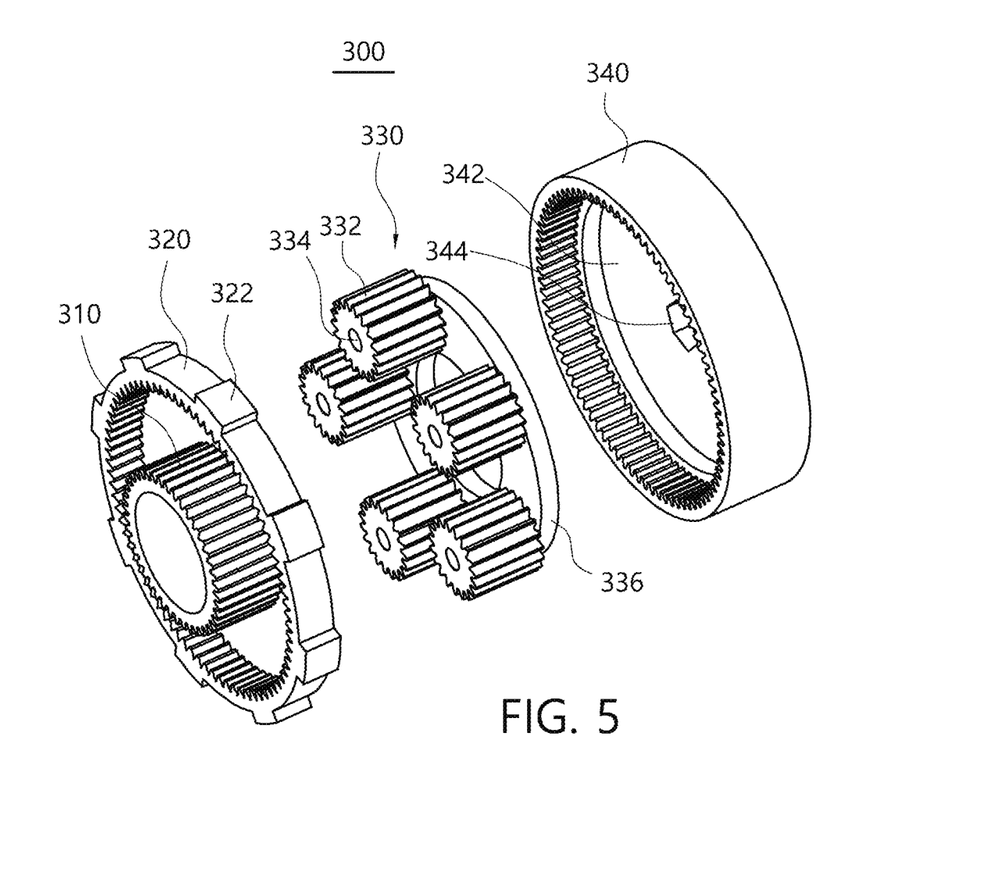
FIG. 5 is an exploded perspective view of a power train of the electromechanical brake according to the embodiment of the present disclosure.

FIG. 5 is an exploded perspective view of the power train of the electromechanical brake according to the embodiment of the present disclosure.

The electromechanical brake 1 according to the embodiment of the present disclosure include the power train 300. In this case, the power train 300 may include a sun gear 310, a planetary gear structure 330, a first ring gear 320, and a second ring gear 340.

As illustrated in FIG. 5, the sun gear 310 is coupled to the rear side of the motor 100. The sun gear 310 rotates about the rotation axis of the motor 100 by receiving the rotational driving power of the motor 100. In this case, to reduce a speed of the motor 100 and transmit the rotational driving power to the nut 400, the sun gear 310 is coupled to the rotary screw 200 through the planetary gear structure 330 without being coupled directly to the rotary screw 200.

As illustrated in FIGS. 3 and 5, the planetary gear structure 330 is disposed on an outer peripheral surface of the sun gear 310. In this case, the planetary gear structure 330 includes: one or more planet gears 332; rotation shaft members 334 configured to respectively support the planet gears 332 so that the planet gears 332 are rotatable; and a rotary body 336 to which the rotation shaft members 334 are fixed to be rotatable together with the one or more planet gears 332.

As illustrated in FIGS. 3 and 5, the rotary body 336 is disposed rearward of the one or more planet gears 332 and supports the rotation shaft members 334 so that the one or more planet gears 332 may engage with the sun gear 310. To this end, the rotary body is formed in a ring shape so that the one or more planet gears 332 may be disposed around the outer peripheral surface of the sun gear 310.

The first ring gear 320 is provided outside the one or more planet gears 332. Therefore, the one or more planet gears 332 engage with an inner portion of the first ring gear 320.

In this case, as illustrated in FIG. 5, one or more fixing protrusions 322 may be formed on an outer peripheral surface of the first ring gear 320. The shape of the fixing protrusion 322 is not limited as long as the fixing protrusion 322 protrudes outward from the outer peripheral surface of the first ring gear 320. As the fixing protrusion 322 is inserted into a groove provided in the cover 54 and formed at a position corresponding to the fixing protrusion 322, the first ring gear 320 may be fixed to the cover 54. Therefore, the first ring gear 320 is fixed to the cover 54 without rotating even though the sun gear 310 and the planet gears 332 rotate.

As illustrated in FIGS. 3 and 5, the second ring gear 340 is disposed rearward of the first ring gear 320. Like the first ring gear 320, the second ring gear 340 is also disposed outside the one or more planet gears 332, the one or more planet gears 332 engage with an inner portion of the second ring gear 340. Therefore, the first ring gear 320 engages with front ends of the planet gear 332, and the second ring gear 340 engages with rear ends of the planet gear 332.

More specifically, as illustrated in FIG. 5, the planet gear 332 is provided as an integrated gear so that the front and rear ends have the same gear ratio. However, the first ring gear 320 and the second ring gear 340 may be designed to be different from each other in number of gear teeth. Therefore, a reduction ratio may be determined based on a ratio of number of teeth between the first ring gear 320 and the second ring gear 340 in case that the rotational driving power of the motor 100 is transmitted from the planet gears 332 through the second ring gear 340. Because the planet gears 332 are integrated as described above, the structure may be simplified, the manufacturing may be facilitated, and the durability may be improved in comparison with a case in which two planet gears 332 are designed to be connected in the related art.

In this case, the rotary screw 200 is fixed to the second ring gear 340, and the rotary screw 200 rotates together with the second ring gear 340 that receives the rotational driving power of the motor 100. To this end, as illustrated in FIG. 3, a plate 342 is formed at a rear side of the second ring gear 340. A hole 344 is formed at a center of the plate 342, and the rear end of the rotary screw 200, i.e., the third body portion 260 may be fitted into the hole 344. The cross-sectional shapes of the third body portion 260 and the hole 344 are not limited as long as the third body portion 260 may be fixedly inserted into the hole 344.

In addition, as illustrated in FIG. 5, the plate 342 of the second ring gear 340 supports the rear surface of the rotary body 336 to prevent the rotary body 336 of the planet gear structure 330 from separating rearward.

As illustrated in FIG. 3, the electromechanical brake 1 according to the embodiment of the present disclosure may further include a thrust bearing 500 and a force sensor 600.

Meanwhile, as illustrated in FIG. 3, the thrust bearing 500 may be disposed between the rear surface of the plate 342 of the second ring gear 340 and the inner surface of the cover 54. When the nut 400 is moved forward by the rotation of the rotary screw 200 and presses the disc 20 through the second brake pad 40, an axial force is applied to the rotary screw 200, and a load is applied to the rear side of the rotary screw 200. A front surface of the thrust bearing 500 is in contact with the rear surface of the plate 342 of the second ring gear 340, and a rear surface of the thrust bearing 500 is in contact with the inner surface of the cover 54, such that the thrust bearing 500 supports the rotary screw 200 to which the load is applied.

In this case, as illustrated in FIG. 3, the force sensor 600 may be disposed rearward of the thrust bearing 500 to measure the axial force applied to the rotary screw 200. However, although not illustrated in the drawings, the force sensor 600 may be disposed forward of the thrust bearing 500. Therefore, the force sensor 600, together with the thrust bearing 500, is disposed between the rear surface of the plate 342 of the second ring gear 340 and the inner surface of the cover 54.

The load measured by the force sensor 600 may be used to determine intensity of the user's pedal effort applied to a pedal or used by a controller to measure a brake pressing degree during autonomous driving.

Figure 6:
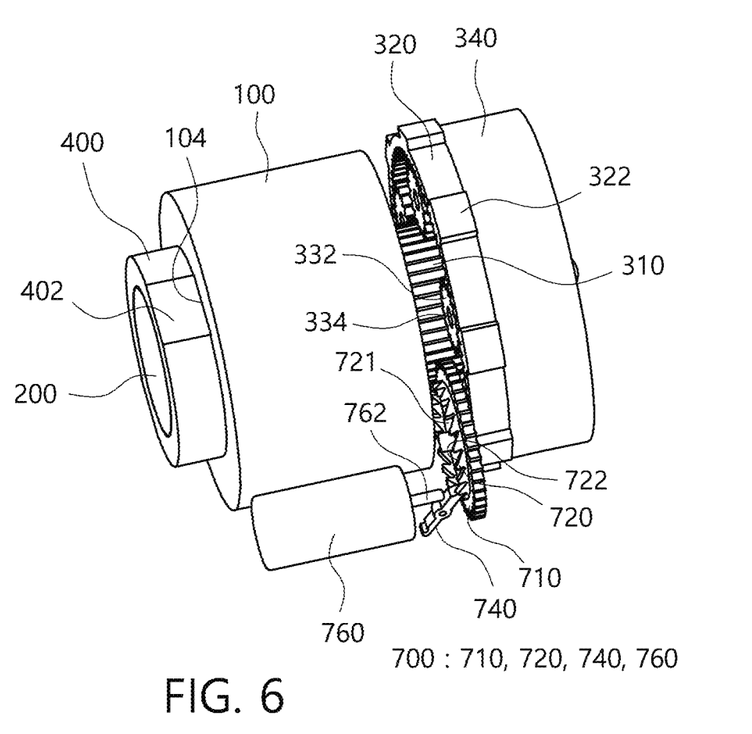
FIG. 6 is an enlarged view of a rotation stopper of the electromechanical brake according to the embodiment of the present disclosure.

FIG. 6 is an enlarged view of a rotation stopper of the electromechanical brake according to the embodiment of the present disclosure.

The electromechanical brake 1 according to the embodiment of the present disclosure may further include a rotation stopper 700. The rotation stopper 700 serves to control the sun gear 310 so that the sun gear 310 may rotate only in one direction.

An auxiliary gear 710 engages with the sun gear 310 so that the rotation stopper 700 restricts the rotation of the sun gear 310. In this case, as illustrated in FIG. 6, to provide a space in which the auxiliary gear 710 engages with the sun gear 310, the rear surface of the motor 100 and the front surface of the first ring gear 320 are disposed to be spaced apart from each other. In this case, the auxiliary gear 710 is coupled in the cover 54 so that the auxiliary gear 710 rotates about a rotation axis parallel to the rotation axis of the sun gear 310. The structure in which the auxiliary gear 710 is coupled in the cover 54 is not limited.

Therefore, the rotation stopper 700 may restrict the rotation of the sun gear 310 by restricting the rotation of the auxiliary gear 710 that engages with the sun gear 310.

More specifically, a first space 721 is formed at a front side of the auxiliary gear 710. In this case, a latch 740 may be inserted into the first space 721. When the latch 740 is inserted into the first space 721, a locked state is made in which the auxiliary gear 710 may rotate only in one direction. In addition, when the latch 740 is withdrawn from the first space 721, an unlocked state is made in which the auxiliary gear 710 may rotate in two directions.

Figure 7:
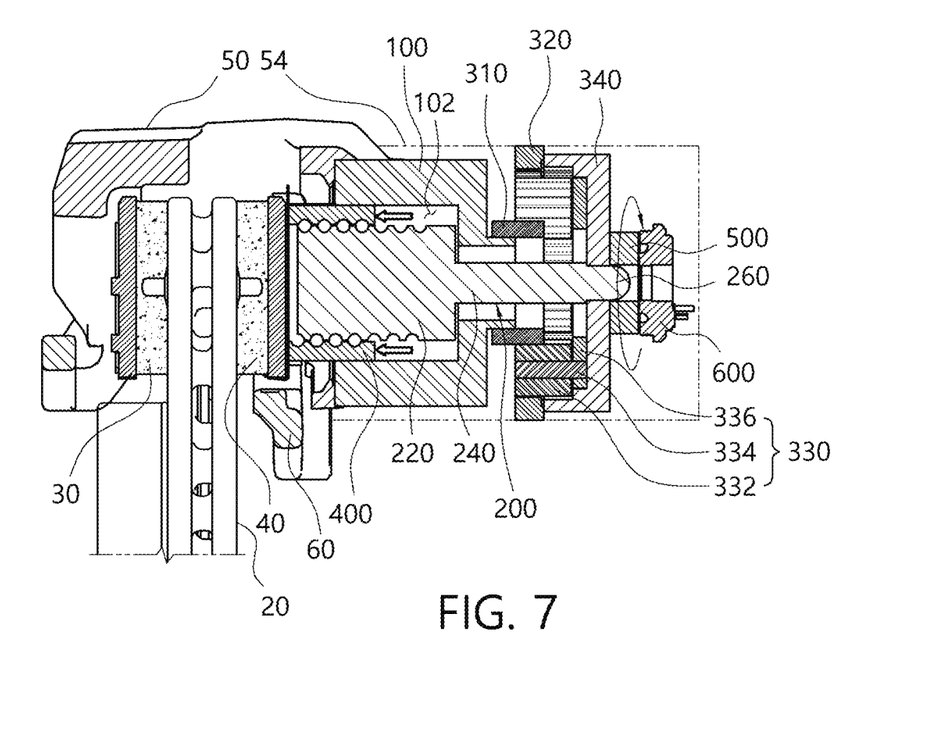
FIG. 7 is a view illustrating a braking state of the electromechanical brake according to the embodiment of the present disclosure.

To this end, the first space 721 is provided at the front side of the auxiliary gear 710 and disposed along a circumference about the third rotation axis 361. As illustrated in FIG. 7, the first space 721 may be formed between a plurality of protrusion portions 720 protruding from a front surface of the auxiliary gear 710. In this case, the protrusion portion 720 may have a guide surface 722 inclined toward one side so that the auxiliary gear 710 may rotate only in one direction in the state in which the latch 740 is inserted into the first space.

Meanwhile, the latch 740 may pivot in the cover 54. Therefore, one side of the latch 740 may be repeatedly inserted into or withdrawn from the first space 721.

In this case, as illustrated in FIG. 7, an actuator 760 is disposed in the cover 54 to rotate the latch 740. The actuator 760 controls the rotation of the latch 740. The actuator 760 may push or pull one side of the latch 740 to rotate the latch 740. To this end, the actuator 760 may be a solenoid switch in which a permanent magnet 762 is disposed at a central portion of a coil wound multiple times, and the permanent magnet 762 may be reciprocated by an electromagnetic force of the coil.

Therefore, as illustrated in FIG. 6, a front end of the permanent magnet 762 may protrude from a front side of the actuator 760 toward one side of the latch 740. In this case, a portion of the latch 740, which is directed toward the permanent magnet, may be made of a metal to which the magnetic force may be applied, and moved by a motion of the permanent magnet. However, the method of rotating the latch 740 is not limited thereto. For example, although not illustrated in the drawings, the latch 740 may be hingedly coupled to a front end of the permanent magnet 762, such that the latch 740 may rotate in accordance with the motion of the permanent magnet 762.

Because the actuator 760 is disposed adjacent to the motor 100, the spatial efficiency in the cover 54 may be improved. Therefore, it is possible to reduce a size of the electromechanical brake 1. In addition, because the rotation stopper 700 is installed on the gear disposed adjacent to the motor 100, it is possible to prevent the power train 300 from warping in the locked state in which the latch 740 supports the protrusion portion 720.

Hereinafter, an operation of the electromechanical brake 1 according to the embodiment of the present disclosure will be described in detail with reference to FIGS. 7 and 8.

FIG. 7 is a view illustrating a braking state of the electromechanical brake according to the embodiment of the present disclosure. FIG. 8 is a traveling state of the electromechanical brake according to the embodiment of the present disclosure.

As illustrated in FIG. 7, in the state in which the electromechanical brake 1 presses the disc 20, the rotational driving power generated by the motor 100 is transmitted to the rotary screw 200 through the power train 300.

Therefore, the rotary screw 200 rotates in one direction, and the nut 400 moves forward along the inner peripheral surface of the internal space 102 of the motor 100 relative to the rotary screw 200. In this case, the front surface of the nut 400 presses the second brake pad 40 and presses the disc 20 through the second brake pad 40.

In this case, to switch the state to the parking state in which the braking state in which the disc 20 is pressed is consistently maintained, the actuator 760 illustrated in FIG. 6 may be used to insert the latch 740 into the first space 721, thereby switching the state to the locked state.

Figure 8:
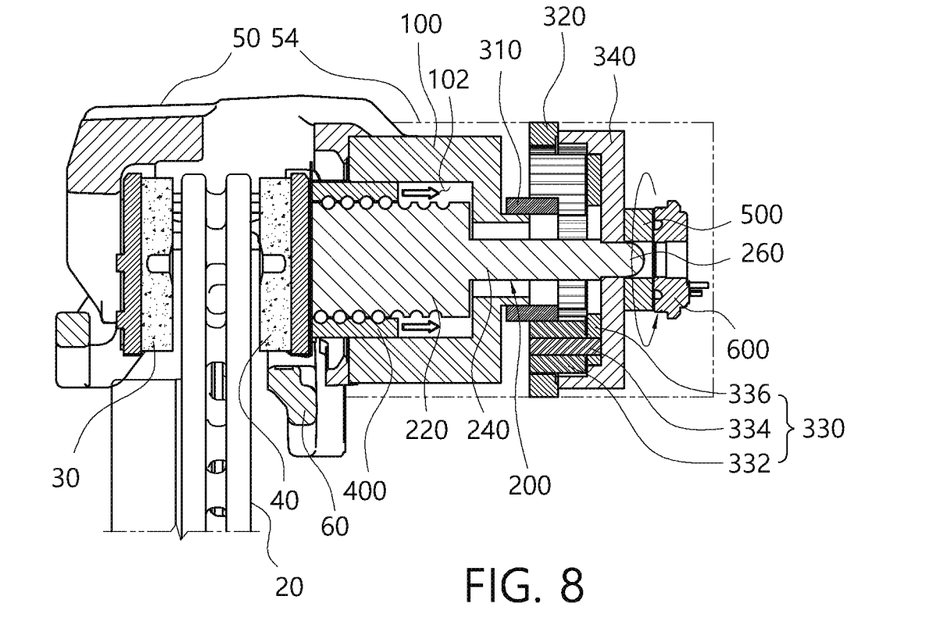
FIG. 8 is a traveling state of the electromechanical brake according to the embodiment of the present disclosure.

In contrast, as illustrated in FIG. 8, in case that the operation of pressing the disc 20 is stopped and the vehicle switches to the traveling state, the motor 100 transmits reverse rotational driving power to the rotary screw 200 through the power train 300.

Therefore, when the rotary screw 200 rotates in the reverse direction, the nut 400 moves rearward along the inner peripheral surface of the internal space 102 of the motor 100 relative to the rotary screw 200 and does not press the second brake pad 40 any further. Therefore, the disc 20 may rotate without constraint.

The electromechanical brake according to the embodiment of the present disclosure may provide the braking force to the vehicle by pressing the disc by using the driving power of the motor.

According to the electromechanical brake according to the embodiment of the present disclosure, the first ring gear and the second ring gear engage with the planet gear integrated to transmit the driving power of the motor, which makes it possible to improve the power transmission efficiency of the power train.

The electromechanical brake according to the embodiment of the present disclosure may electronically provide the service brake function and the parking brake function without a hydraulic line.

The electromechanical brake according to the embodiment of the present disclosure has the nut, which may relatively reduce damage and a backlash of the rotary screw in the braking environment in which dust and foreign substances are easily produced.

The electromechanical brake according to the embodiment of the present disclosure may maintain the braking force of the brake in the parking situation.

The effects of the present disclosure are not limited to the above-mentioned effects, and it should be understood that the effects of the present disclosure include all effects that may be derived from the detailed description of the present disclosure or the appended claims.

The electromechanical brake according to the embodiments of the present disclosure has been described above. In the present specification, the present disclosure provides the arrangement structure of the power train having the planet gear structure for efficiently transmitting the rotational driving power of the motor and improving the durability of the internal components while using the motor to press the disc. In addition, the present disclosure provides the electromechanical brake that may have the rotation stopper and perform the service brake function and the parking brake function by using the single motor without providing a separate parking brake operated by a hydraulic line.

It can be clearly understood, by those skilled in the art to which the present disclosure pertains, that the electromechanical brake according to the present embodiment may be applied not only to the brake system for a vehicle, but also to a brake for braking any rotating object.

While the exemplary embodiments according to the present disclosure have been described above, it is obvious to those skilled in the art that the present disclosure may be specified in other particular forms in addition to the aforementioned embodiments without departing from the spirit or the scope of the present disclosure. Accordingly, it should be understood that the aforementioned embodiments are not restrictive but illustrative, and thus the present disclosure is not limited to the aforementioned description, and may be modified within the scope of the appended claims and the equivalent range thereto.

DESCRIPTION OF REFERENCE NUMERALS

1: Electromechanical brake
330: Planet gear structure
20: Disc
332: Planet gear
30: First brake pad
334: Rotation shaft member
40: Second brake pad
336: Rotary body
50: Housing
340: Second ring gear
54: Cover
342: Plate
60: Carrier
344: Hole
100: Motor
400: Nut
102: Internal space
402: First cut-out surface
104: Second cut-out surface
500: Thrust bearing
200: Rotary screw
600: Force sensor
220: First body portion
700: Rotation stopper
240: Second body portion
720: Fixing protrusion
260: Third body portion
721: First space
300: Power train
722: Inclined surface
310: Sun gear
740: Latch
320: First ring gear
760: Actuator
322: Fixing protrusion

What is claimed is:

1. An electromechanical brake, which includes a first brake pad and a second brake pad configured to respectively press a front surface and a rear surface of a disc, the electromechanical brake comprising:
   a housing having one side to which the first brake pad is coupled;
   a carrier to which the second brake pad is fixed, the carrier being coupled to the housing so that the second brake pad advance or retreat toward the disc;
   a hollow motor installed on the housing and configured to provide rotational driving power, the hollow motor having an internal space penetratively formed in a direction in which the rotation axis extends;
   a rotary screw extending and disposed in the internal space, the rotary screw being configured to rotate about the rotation axis of the motor;
   a power train coupled to a rear side of the motor and configured to transmit the rotational driving power of the motor to the rotary screw; and
   a nut coupled to the rotary screw and configured to advance or retreat toward the second brake pad,
   wherein the power train comprises:
   a sun gear coupled to the rear side of the motor and configured to be rotated about the rotation axis by the rotational driving power of the motor;
   a planetary gear structure disposed outside the sun gear and comprising one or more planet gears each having a front end that engages with the sun gear;
   a first ring gear having an inner portion that engages with the front ends of the one or more planet gears; and
   a second ring gear having an inner portion that engages with rear ends of the one or more planet gears;

wherein a rear end of the rotary screw is coupled to the second ring gear, and the rotary screw rotates about the rotation axis together with the second ring gear, and wherein the electromechanical brake further comprises an auxiliary gear configured to engage with the sun gear, and a rotation stopper configured to control the auxiliary gear so that the auxiliary gear rotates only in one direction.

2. The electromechanical brake of claim 1, wherein the number of gear teeth of the first ring gear is different from the number of gear teeth of the second ring gear.

3. The electromechanical brake of claim 1, wherein the nut is disposed between the rotary screw and the motor, an outer peripheral surface of the nut corresponds to an inner peripheral surface of the motor, and an anti-rotation part is provided between the nut and the motor and prevents the nut from rotating together with the rotary screw.

4. The electromechanical brake of claim 3, wherein the anti-rotation part comprises:
a first cut-out surface formed on the outer peripheral surface of the nut in a longitudinal direction of the rotary screw; and
a second cut-out surface formed on the inner peripheral surface of the motor and corresponding to the cut-out surface.

5. The electromechanical brake of claim 1, wherein a plate is provided at a rear side of the second ring gear, the plate has a hole formed at a center thereof, and a rear end of the rotary screw is fixedly inserted into the hole.

6. The electromechanical brake of claim 5, further comprising:
a cover disposed at a rear side of the housing and configured to cover the motor and the power train; and
a thrust bearing disposed between the cover and the plate of the second ring gear to support a load according to an axial force of the rotary screw.

7. The electromechanical brake of claim 5, further comprising:
a cover disposed at a rear side of the housing and configured to cover the motor and the power train; and
a force sensor disposed between the cover and the plate of the second ring gear to measure a load according to an axial force of the rotary screw.

8. The electromechanical brake of claim 1, further comprising:
a cover disposed at a rear side of the housing and configured to cover the motor and the power train,
wherein at least one fixing protrusion protrudes from an outer peripheral surface of the first ring gear, and at least one groove is formed in an inner peripheral surface of the cover so that the at least one fixing protrusion is inserted into the at least one groove so that the first ring gear is fixed to the cover.

9. The electromechanical brake of claim 1, wherein the rotary screw is coupled to the nut by ball-screw-nut coupling.

10. An electromechanical brake, which includes a first brake pad and a second brake pad configured to respectively press a front surface and a rear surface of a disc, the electromechanical brake comprising:
a housing having one side to which the first brake pad is coupled;
a carrier to which the second brake pad is fixed, the carrier being coupled to the housing so that the second brake pad advance or retreat toward the disc;
a hollow motor installed on the housing and configured to provide rotational driving power, the hollow motor having an internal space penetratively formed in a direction in which the rotation axis extends;
a rotary screw extending and disposed in the internal space, the rotary screw being configured to rotate about the rotation axis of the motor;
a power train comprising a sun gear coupled to a rear side of the motor and configured to be rotated about the rotation axis by the rotational driving power of the motor, a planetary gear structure disposed outside the sun gear and comprising one or more planet gears each having a front end that engages with a rear end of the sun gear, a first ring gear having an inner portion that engages with the front ends of the one or more planet gears, the first ring gear having a front end surface disposed to be spaced apart from a rear end surface of the motor, and a second ring gear having an inner portion that engages with rear ends of the one or more planet gears, the power train being coupled to the rear side of the motor and configured to transmit the rotational driving power of the motor to the rotary screw;
a nut coupled to the rotary screw and configured to advance or retreat toward the second brake pad;
an auxiliary gear configured to engage with a front end of the sun gear and rotate about a rotation axis parallel to a rotation axis of the sun gear; and
a rotation stopper configured to control the auxiliary gear so that the auxiliary gear rotates only in one direction,
wherein a rear end of the rotary screw is coupled to the second ring gear, and the rotary screw rotates about the rotation axis together with the second ring gear.

11. The electromechanical brake of claim 10, wherein the rotation stopper comprises a latch configured to be inserted into a first space formed at one side of the auxiliary gear,
wherein the auxiliary gear is in a locked state in which the auxiliary gear rotates only in one direction when the latch inserted into the first space, and
wherein the auxiliary gear is in an unlocked state in which the auxiliary gear rotates in two directions when the latch is withdrawn from the first space.

12. The electromechanical brake of claim 11, wherein the latch is pivotably fixed in the housing,
wherein the rotation stopper further comprises:
a plurality of protrusion portions continuously formed at one side of the auxiliary gear along a circumference of the auxiliary gear; and
an actuator configured to control the pivot motion of the latch, and
wherein the first space is provided as a plurality of first spaces disposed between the plurality of protrusion portions.

13. The electromechanical brake of claim 12, wherein an inclined guide surface is provided at one side of each of the plurality of protrusion portions in a circumferential direction of the auxiliary gear.

14. A vehicle comprising:
the electromechanical brake of claim 11;
a vehicle wheel having a one side to which a disc is coupled so that rotation axes of the vehicle wheel and the disc are coincident with each other;
the first brake pad disposed at one side of the disc and coupled to the electromechanical brake; and
the second brake pad disposed at the other side of the disc and coupled to the electromechanical brake,
wherein a rotational speed of the vehicle wheel is controlled by pressing the second brake pad in the state in which the unlocked state is maintained in a traveling state, and wherein the locked state is maintained in the state in which the second brake pad is pressed in a parking state.

\* \* \* \* \*